United States Patent Office 3,270,833
Patented Sept. 6, 1966

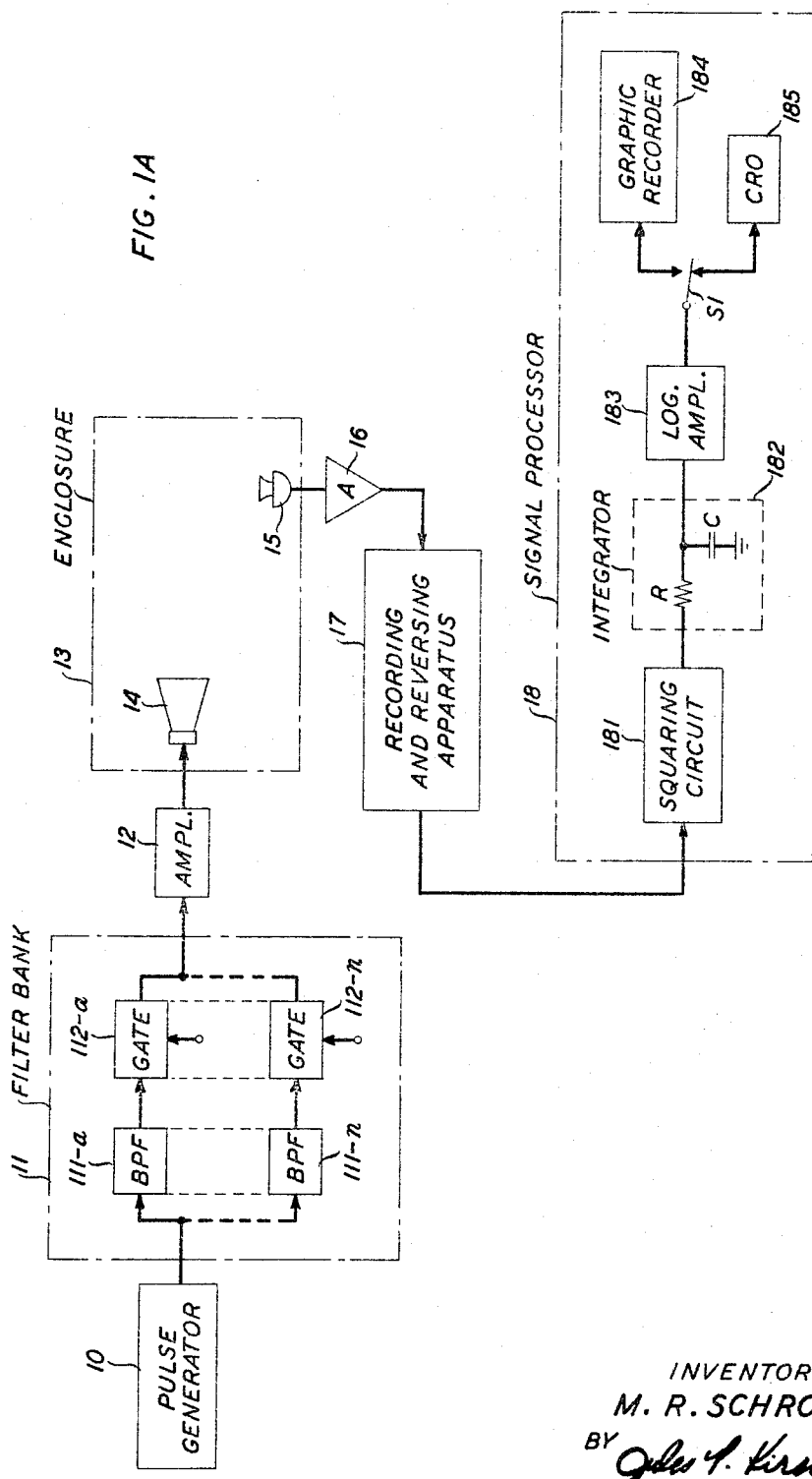

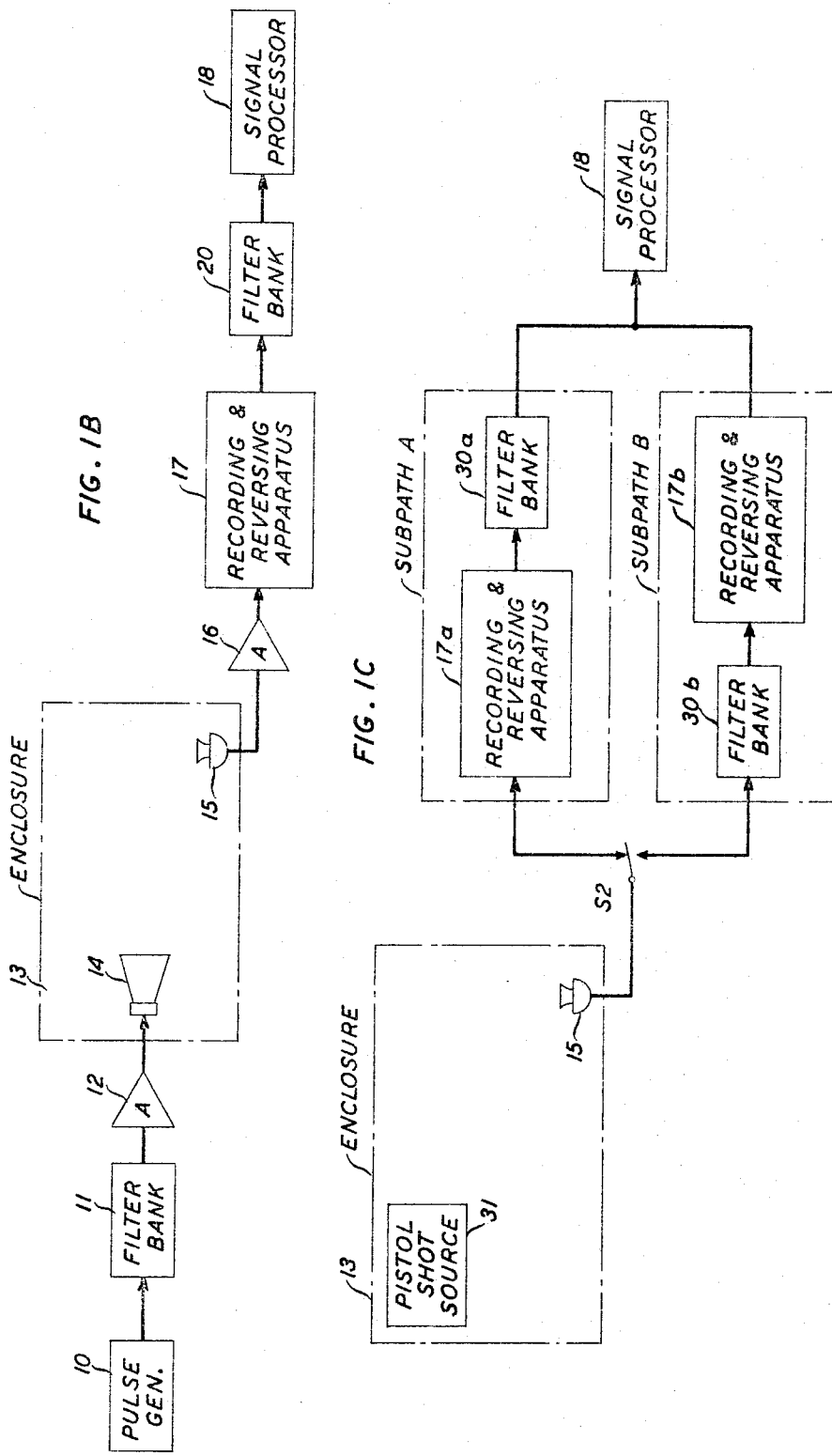

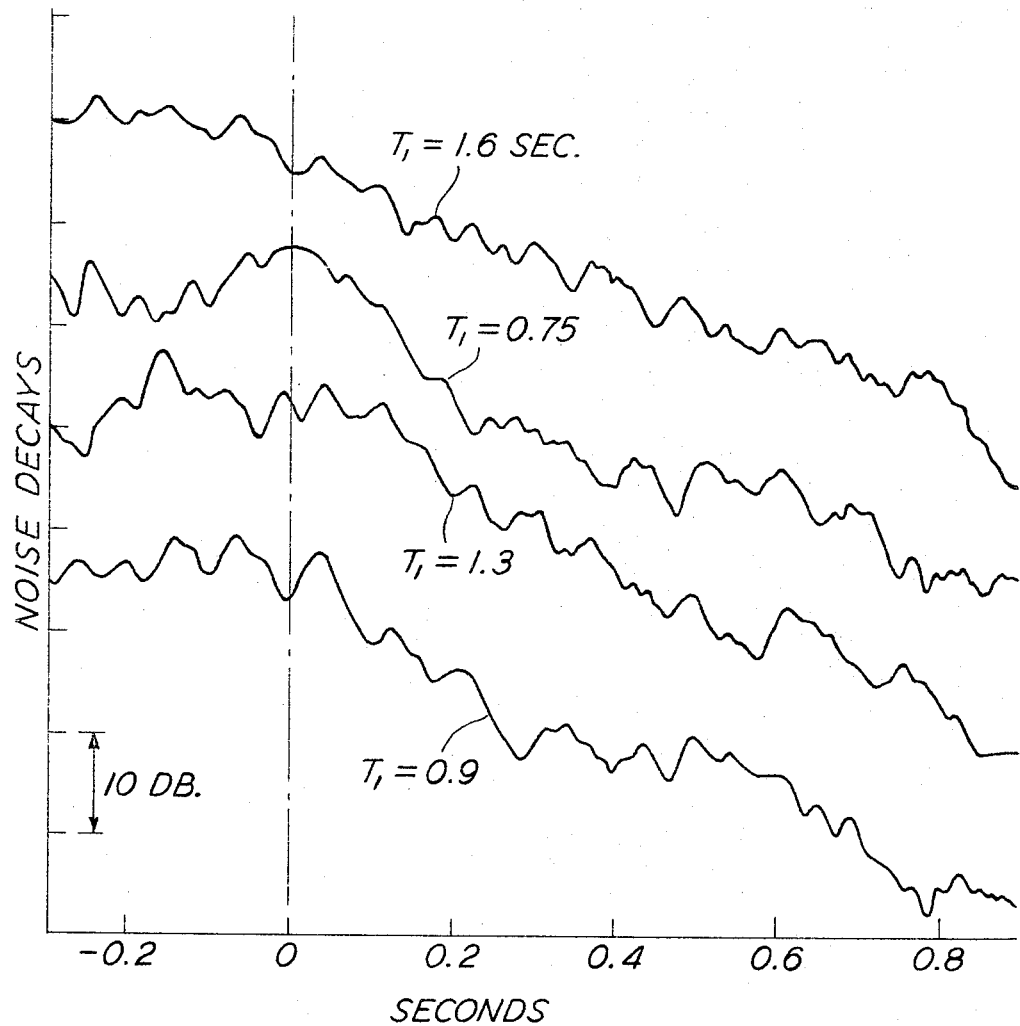

3,270,833
METHOD OF AND APPARATUS FOR MEASURING ENSEMBLE AVERAGES AND DECAY CURVES
Manfred R. Schroeder, Gillette, N.J., assignor to Bell Telephone Laboratories, Incorporated, New York, N.Y., a corporation of New York
Filed Dec. 10, 1964, Ser. No. 417,364
9 Claims. (Cl. 181—.5)

This invention relates in general to the determination of the response of a system to an applied excitation signal, and in particular to the determination of the acoustic properties of an enclosure in response to an applied excitation signal.

In the acoustic design of enclosures such as auditoriums, concert halls, and other types of rooms, it is necessary to ascertain precisely a number of different acoustic properties. One of the most useful techniques for determining several of these acoustic properties is to obtain a so-called decay curve for the enclosure under study. Such a curve is obtained by generating a selected sound signal at one point in the enclosure until the sound pressure level builds up to a desired level, following which the sound excitation signal is stopped and the decay of the signal received at another selected point in the enclosure is plotted as a function of time to produce the decay curve. The details of this process are given in several well known texts exemplified by that of L. L. Beranek entitled "Acoustic Measurements," chapter 18 (1949).

Theoretically, a decay curve should reveal several important properties of the enclosure. For example, one of the best known acoustic properties is reverberation time, which may be determined by measuring the length of time required for the sound pressure level to decay 60 decibels from its steady state. Another important characteristic is the presence or absence of multiple decay rates, since the existence of multiple decay rates points to a lack of sound diffusion within the enclosure. Furthermore, the initial decay rate is important in determining the statistical absorption coefficient of various materials employed in the enclosure, as well as the subjective "reverberancy" of the enclosure.

In practice, however, decay curves obtained from actual experiments often fail to reveal clearly the acoustic properties described above because of random irregularities or fluctuations that appear in such curves. When random noise is used as an excitation signal, part of the reason for these fluctuations is attributable to randomness in the initial amplitudes and phase angles of the noise frequency components from trial to trial; however, similar irregularities appear when other signals such as warble tones are used to excite the enclosure. As a result, different decay curves are obtained under identical physical conditions, that is, despite identical transmitting and receiving positions, random fluctuations in the decay curves cause within the same enclosure each curve to have a different variation with time. Further, the random fluctuations that appear in the different decay curves not only make it difficult to measure reverberation time with accuracy but also tend to mask the presence of multiple decay rates and the initial decay rate.

It is well known, of course, that a relatively accurate measurement of reverberation time may be obtained by plotting many decay curves under identical physical conditions and averaging the individual reverberation times of the various curves. However, in addition to the obvious inefficiency of a procedure that requires the plotting of many decay curves and the averaging of many individual measurements derived from the plotted curves, such a procedure does little to remove random fluctuations that mask multiple decay rates and the initial decay rate.

In the present invention, it is recognized that the ideal solution for removing random fluctuations from decay curves would be to average a sufficiently large number of the decay curves themselves to obtain a single "ensemble average" decay curve. It is further recognized in the present invention that there is a practical, realizable equivalent to this ideal solution in which by generating an appropriate excitation signal and by properly processing the received sound signal there is obtained a single decay curve that is representative of the ensemble average over infinitely many decay curves. Specifically, it has been determined that the ensemble average of infinitely many received signals, each raised to the second power, is identical to a certain single integral of the impulse response of the enclosure, raised to the second power. A signal representative of the impulse response of an enclosure is obtained by exciting the enclosure with a relatively brief impulse containing energy in the frequency range of interest, and recording the resulting received signal on a suitable medium such as magnetic tape. The recorded signal is then reproduced in a direction opposite to that in which it was recorded, and the reproduced reversed direction signal is raised, to the second power and integrated to develop an output signal representative of the decay characteristic of the enclosure. By plotting this output signal on a suitable medium, there is obtained a single, monotonic decay curve that is free from the random fluctuations discussed above and which is equivalent to the ensemble average of infinitely many decay curves obtained by repeatedly exciting the enclosure with signals having the same spectrum as the impulses of the present invention. From this single, monotonic decay curve the acoustic properties described above may be determined quickly and without ambiguity.

The invention will be fully understood from the following description of illustrative embodiments thereof, taken in connection with the appended drawings, in which:

FIG. 1A is a block schematic diagram showing apparatus for obtaining a decay curve in accordance with the principles of this invention;

FIGS. 1B and 1C are block schematic diagrams showing alternative apparatuses for obtaining a decay curve in accordance with the principles of this invention;

FIG. 2 illustrates certain graphs which are of assistance in explaining the principles of this invention.

*Theoretical considerations*

Figure 3A:
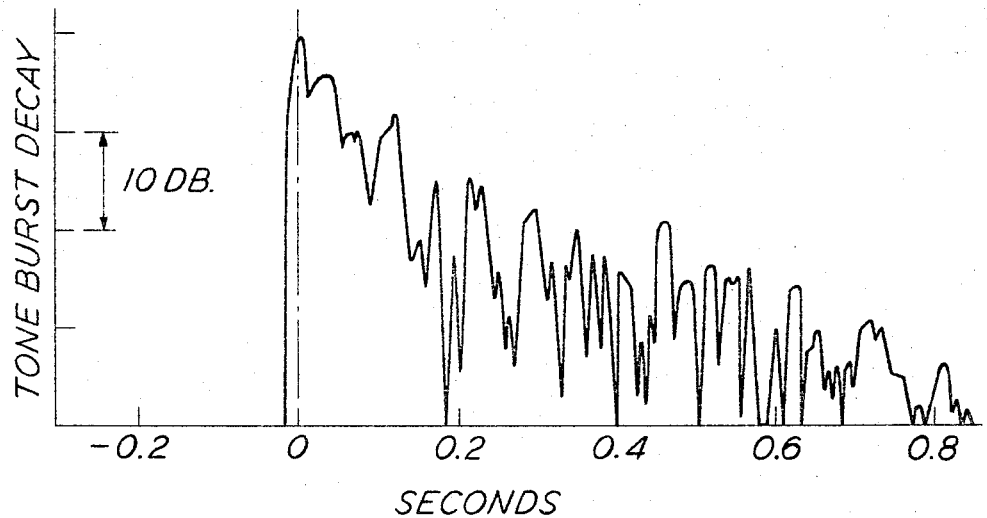
FIGS. 3A and 3B illustrate additional graphs which assist in understanding the principles and operation of this invention.

Let $n(t)$ represent a "stationary white" noise function or signal. "Stationarity" means that the autocovariance function of $n(t)$, denoted $<n(t_1) \cdot n(t_2)>$, depends only on the time difference, $(t_2-t_1)$, the bracket symbol "$<>$" indicating "ensemble average" of the quantities enclosed within the brackets. "Whiteness" means that the autocovariance function is zero everywhere except for $t_1=t_2$. For further discussion of the meaning of these terms see R. B. Blackman and J. W. Tukey, "The Measurement of Power Spectra from the Point of View of Communications" vol 37 B.S.T.J. 185, 485 (1958). It is well known that because white noise has an infinitely broad power spectrum, the autocovariance function of $n(t)$ may be expressed in terms of the Dirac delta function, $\delta(t_2-t_1)$, $$<n(t_1) \cdot n(t_2)> = N \cdot \delta(t_2-t_1) \tag{1}$$

where N is a constant of proportionality representing the power per unit bandwidth of $n(t)$.

In obtaining a decay curve of an enclosure excited by a noise signal, the noise excitation signal is usually filtered before it is radiated into the enclosure in order to give the signal the desired spectrum; for example, it is customary for the excitation signal spectrum to have a bandwidth covering one or one-third octave. The filtered noise signal is radiated from a first selected position into the enclosure and switched off after a desired sound pressure level has been reached. During the radiation of filtered noise into the enclosure, there is received at a second selected position within the enclosure a signal denoted $s(t)$ which represents the signal resulting from the passage of the filtered noise signal through the system comprising noise filter, amplifiers, transducers, and enclosure between transmitting and receiving points. By denoting the impulse response of the entire filter-amplifier transducer-enclosure system $r(t)$, the received signal may be expressed as $$s(t) = \int_{(-\infty)}^{0} n(\tau) \cdot r(t-\tau) d\tau \qquad (2)$$

the lower limit $(-\infty)$, indicating that the noise signal is switched on for a sufficient length of time for the sound field in the enclosure to have reached a desired level, and the upper limit 0, indicating the time at which the noise signal is switched off. In practice, $(-\infty)$ may be on the order of two seconds before the noise signal is switched off. By squaring Equation 2, there is obtained a double intergral expression for the square of the received signal, $$s^2(t) = \int_{(-\infty)}^{0} n(\tau) \cdot r(t-\tau) d\tau \cdot \int_{(-\infty)}^{0} n(\theta) r(t-\theta) d\theta$$

$$= \int_{(-\infty)}^{0} d\tau \int_{(-\infty)}^{0} d\theta n(\tau) \cdot n(\theta \cdot r(t-\tau) \cdot r(t-\theta) \qquad (3)$$

Further, by averaging the squared received signal over the ensemble of infinitely many received signals and applying Equation 1 to Equation 3, the ensemble average, $<s^2(t)>$, may be written $$<s^2(t)> = \int_{(-\infty)}^{0} d\tau \int_{(-\infty)}^{0} d\theta <n(\tau) \cdot n(\theta)> r(t-\tau) r(t-\theta) = \int_{(-\infty)}^{0} d\tau \int_{(-\infty)}^{0} d\theta N\delta(\tau-\theta) r(t-\tau) r(t-\theta) \qquad (4)$$

Since by definition the delta function $\delta(\theta-\tau)$ vanishes except when $\theta=\tau$, and since the integral over the delta function equals unity, integration over $\theta$ in Equation 4 yields $$<s^2(t)> = N \cdot \int_{(-\infty)}^{0} r^2(t-\tau) d\tau \qquad (5)$$

or, after substituting the new integration variable $x$ for $(t-\tau)$, $$<s^2(t)> = -N \int_{(+\infty)}^{t} r^2(x) dx = N \int_{t}^{(\infty)} r^2(x) dx \qquad (6)$$

According to Equation 6, the ensemble average of infinitely many squared received signals is proportional to a selected integral of the squared impulse response of the entire enclosure system including a bandpass, filter, amplifiers, and transducers connected in series with an enclosure. In other words, the ensemble average of an infinite number of squared received signals may be evaluated by performing a single integration of the quantity $r^2(t)$.

In order to evaluate automatically the integral on the right-hand side of Equation 6, it is first observed that it is necessary to obtain as an output signal of the enclosure system a signal representative of the impulse response $r(t)$, of the system. In accordance with well known results in network and filter theory, the output signal of a linear system represents the impulse response of the system provided that the input signal is a Dirac delta function. Hence a signal proportional to $r(t)$ may be obtained at the output terminal of the enclosure system by applying a relatively brief pulse of energy to the input terminal of the system.

Automatic evaluation of the right-hand side of Equation 6 also requires adjustment of the limits of integration if a digital computer is not available to assist in calculation. By making the useful substitution $x=-y$, the right-hand side of Equation 6 may be rewritten, without the constant factor N, $$\int_{t}^{(\infty)} r^2(x) dx = -\int_{-t}^{(-\infty)} r^2(-y) dy$$

$$= \int_{(-\infty)}^{t} r^2(-y) dy \qquad (7)$$

From Equation 7 it is evident that the integral may be evaluated by integrating $r^2(-y)$ from $(-\infty)$ to $(-t)$. Since $t$ is a variable which ranges between $(-\infty)$ and $(+\infty)$, the upper limit, $(-t)$, merely represents some convenient point in time subsequent to the lower limit, $(-\infty)$. In practice, the lower limit may be on the order of two seconds before the excitation signal is turned off, and the maximum value of the upper limit may be on the order of one second after the excitation signal is turned off. The negative argument in the integrand indicates that the received signal representing the impulse response is to be reversed in direction before it is squared and integrated; for example, after the received signal has been recorded on a suitable medium, the recorded signal is reproduced in a reversed direction by reversing the direction of the recording medium, following which the reversed reproduction of the received signal is squared and integrated.

*Apparatus*

Apparatus for obtaining a single measurement a decay curve representative of the ensemble average of infinitely many squared noise decay signals in accordance with Equations 6 and 7 is shown in FIGS. 1A, 1B, and 1C. Referring first to FIG. 1A, this drawing illustrates apparatus in which the input and output points of the enclosure system are defined to include filter bank 11, amplifier 12, loudspeaker 14, enclosure 13, microphone 15, and amplifier 16. Hence an output signal representative of the impulse response of this system is obtained at the output terminal of amplifier 16 by applying a single relatively brief pulse having a sufficiently broad spectrum from pulse generator 10 to the input terminal of filter bank 11. Filter bank 11 includes a plurality of parallel connected bandpass filters 111a through 111n each of which is followed by a corresponding switch, illustrated by transmission gates 112a through 112n. Each filter is designed to have a pass band covering a predetermined frequency range, and by enabling a selected gate the output signal of a corresponding filter is delivered via amplifier 12 to a loudspeaker 14 located at a first predetermined position within enclosure 13 in order to be radiated into enclosure 13. The signal radiated into enclosure 13 is altered by the characteristics of the enclosure to produce at a second selected position within enclosure 13 a received signal which after detection by microphone 15 and passage through amplifier 16 is representative of the impulse response of the enclosure, denoted $r(x)$, in the frequency range of interest.

Element 17 records the impulse response signal from amplifier 16 on a suitable medium, for example, on conventional magnetic tape, after which the tape is reversed in direction so that when it is replayed in element 17 there is developed at the output terminal of element 17 an output signal representative of $r(-y)$, as specified by Equation 7, that is, $r(-y)$ is reversed in direction with respect to the incoming signal $r(x)$ from microphone 15, since $x=-y$. This reversed direction output signal from element 17 is then applied to signal processor 18. Within processor 18 the reversed direction signal is first passed through squaring circuit 181, squaring circuit 181 being a conventional device for developing an output signal whose amplitude is proportional to the square or second power of the amplitude of an incoming signal. From circuit 181 the squared output signal is integrated within integrator 182, thereby to develop on capacitor C a voltage proportional to the right-hand side of Equation 7. Integrator 182 may be of the well known RC variety, as shown in the drawing, but if desired other kinds of integrators may be employed.

To obtain a visually perceptible decay curve, the integrated signal developed by circuit 182 is passed through logarithmic amplifier 183 to either a graphic recorder 184 or a cathode ray oscilloscope 185, as directed by the appropriate setting of switch S1. FIG. 3B illustrates a decay curve X representative of the sound decay within enclosure 13, derived in accordance with Equation 7, in which it is observed that the direction of curve X is reversed with respect to the normal direction of the time scale. Curve Y shows curve X plotted in the conventional direction.

An alternative to the apparatus of FIG. 1A is shown in FIG. 1B, in which filter bank 11 is supplemented by a complementary filter bank 20 interposed between recording and reversing mechanism 17 and signal processor 18. The purpose of filter bank 20 is to remove unwanted noise and distortion from the signal from element 17, and to compensate for filter phase distortion introduced within filter bank 11. Alternatively, filter bank 20 may be designed to introduce a phase distortion sufficient to lower substantially the peak factor of the signal radiated into enclosure 13, thereby permitting an increased amount of energy to be radiated into enclosure 13 with a given array of amplifiers 12 and 16 and transducers 14 and 15.

If desired, the enclosre system may be considered to include only the enclosure, in which case the received signal at a point within the enclosure represents the impulse response of the enclosure. In order for the received signal to represent the impulse response of the enclosure, it is necessary to excite the enclosure with a relatively brief impulse of acoustic energy; for example, a pistol shot, a clap, or some other sound burst having a relatively short duration and substantial energy over a relatively wide frequency range. Turning now to FIG. 1C, this drawing illustrates apparatus in which the enclosure being tested is the only element of the enclosure system. A pistol shot source 31 generates a brief acoustic impulse at a first selected point within enclosure 13, and the resulting sound received at a second point within the enclosure represents the impulse response of the enclosure. The received sound is detected by microphone 15 and converted into an electrical signal which is delivered by way of switch S2 to one of two subpaths, A and B. Within subpath A, the electrical signal from microphone 15 is recorded and reproduced in element 17a, which may be identical with element 17 in FIG. 1A, to generate a reversed direction output signal. The reversed direction output signal from element 17 is passed through filter bank 30a, which may be identical with filter bank 11, to eliminate in the reversed direction signal all but the frequency components for which it is desired to plot a decay curve. The filtered signal from filter bank 30a is then delivered to signal processor 18, which operates in the fashion described above for the identically labelled element in FIG. 1A to square and integrate the filtered signal in accordance with Equation 7. If desired, the squared and integrated signal developed by processor 18 may be displayed visually in the manner shown in FIG. 1A.

A decay curve for each of a number of desired frequency bands may be obtained from the reversed direction output signal produced in each of the arrangements shown in FIGS. 1A, 1B, and 1C. Thus a decay curve for each of a number of desired frequency bands may be obtained in the apparatus shown in FIGS. 1A and 1B by generating a separate pulse for each curve from generator 10, followed by enabling the appropriate gate in filter bank 11 to pass the desired frequency components through the enclosure system. Similarly, in the apparatus shown in FIG. 1C, the reversed direction output signal of element 17a may be repeatedly reproduced, and each reproduction may be passed through a different one of the filters in filter bank 30a. Alternatively, the pistol shot sound may be repeated in enclosure 13, in which case each of the corresponding electrical signals from microphone 15 is applied to subpath B. Within subpath B, each of the electrical signals corresponding to a different pistol shot is passed through a different selected one of the filters in filter bank 30b followed by recording and reversing apparatus 17b, both element 30b and element 17b being identical in construction with corresponding elements 30a and 17a in subpath A. By selecting a different filter in direction signal from element 17b a corresponding decay bank 30b for each electrical signal from microphone 15, processor 18 develops from each corresponding reversed curve for the frequency band passed by the selected filter.

Figure 3B:
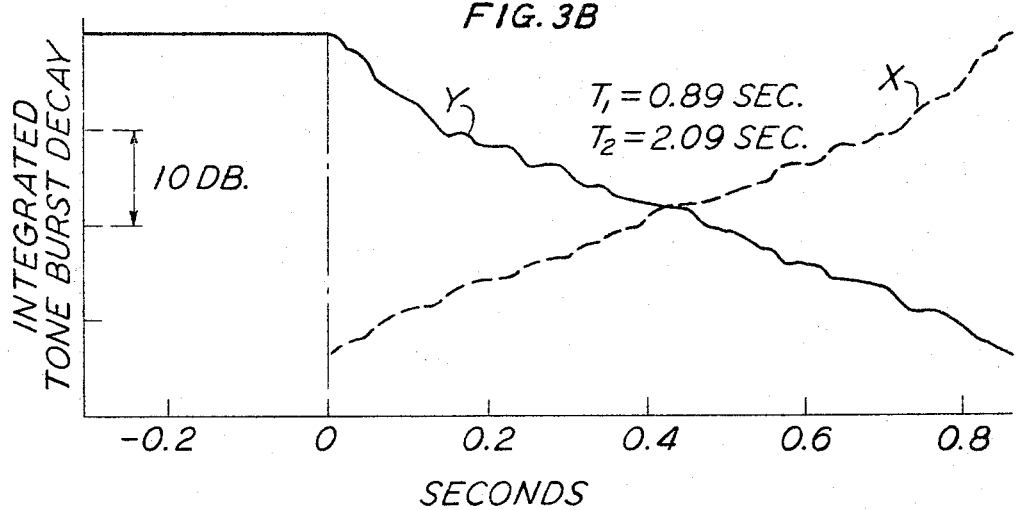

The reduction in randomness in decay curves obtained by means of this invention is illustrated by FIGS. 2, 3A, and 3B. FIG. 2 shows four noise decay curves obtained for the same transmitting and receiving positions and identical physical conditions in a large concert hall. The noise band had a center frequency of 167 cycles per second and a three decibel bandwidth of 38 cycles per second, corresponding to a third of an octave. The time at which the noise source was switched off is indicated by the vertical dashed line. The most severe random fluctuations in the decay curve were smoothed out by the finite writing speed of the graphic recorder employed to plot the decay curve. Even so, the remaining fluctuations do not allow one to make meaningful statements about the nature of the decay and the initial and final decay rates on the basis of a single decay curve. For example, the initial decay rates, as defined by best straight line fits over the first 10 decibels of the decays, vary over a range of more than 2:1. The corresponding reverberation times $T_1$ vary from 0.75 seconds to 1.6 seconds. Also, it is difficult to say on the basis of the four noise decays whether the logarithmic decay curve is essentially linear or double-sloped. The topmost decay curve in FIG. 2, for example, looks quite linear, while the decay curve directly below it seems to stem from a strongly nonlinear or nonexponential reverberation process. The actual characteristics of the reverberation process in this hall, for the stated frequency band and locations, are therefore difficult to determine from the FIG. 2 decay curves because the decay is "masked" by the irrelevant randomness resulting from the exciting noise signal.

Turning now to FIGS. 3A and 3B, the curve in FIG. 3A shows the response of the same enclosure system as in FIG. 2 to a single, relatively brief pulse for the same loudspeaker and microphone locations that were used to obtain the noise decays shown in FIG. 2; in addition, the spectrum of the signal radiated into the enclosure was identical to that of the noise excitation signals used in obtaining the noise decay curves shown in FIG. 2. In contrast with FIG. 3A, curve Y in FIG. 3B shows the integral of the squared received signal from time $t$ to 1 second, the greater regularity of the FIG. 3B decay curve being immediately apparent. This was to be expected because, according to Equations 6 and 7, the integral of the squared received signal is identical to the average of infinitely many noise decays like those shown in FIG. 2.

Also, because the squared received signal is a positive function of time, its integral is a monotonically decreasing function of time—in contrast to noise decays which fluctuate both down and up, as shown in FIG. 2. The fact that decay curves obtained by the integrated signal technique of this invention are monotonically decreasing is in accordance with intuition which requires that the sound energy in an enclosure should always decrease with time when no energy is being radiated into the enclosure. The monotonicity of the decay of the integrated tone burst can be seen in FIG. 3B.

The double-sloped nature of the sound decay is also clearly revealed in FIG. 3B. On the basis of such decay curves, reverberation times can be determined with great precision. In FIG. 3B, the "initial" reverberation time $T_1$ (for the first 10 decibels of the decay) is 0.89 second and the "final" reverberation time $T_2$ (for the remainder of the decay) is 2.09 seconds. It is particularly noteworthy that even the first few decibels of the decay show little deviation from a straight line. Thus, when using the integrated signal response method to measure reverberation time, one does not have to omit this early portion of the decay which is now widely recognized as having prime importance in determining subjective "reverberancy."

The remaining small fluctuations in the decay curve in FIG. 3B arise entirely from properties of the enclosure, for example, arrival time distribution of the echoes in the chosen frequency band, and from the selected loudspeaker and microphone positions within the enclosure. If desired, these fluctuations could be further reduced by averaging over several different paths within the enclosure and by employing wider frequency bands for the tone bursts. At higher frequencies, the bandwidths are usually larger than the 38 cycles per second used for the decay shown in FIG. 2, anyhow.

The greater precision of measured reverberation times obtained by the integrated signal method of this invention should also benefit both the accuracy and reproducibility of measurements of sound absorption coefficients in reveration chambers. In addition, the easily discernible occurrence of double-sloped decays could serve as a reliable indicator of insufficient sound diffusion.

Although this invention has been described in terms of measuring the acoustic response of an enclosure, it is to be understood that applications of the principles of this invention are not limited to acoustics but include other measurements in which excitation by noise or other signals produces random fluctuations that tend to mask the response characteristics of the system being analyzed. In addition, it is to be understood that the above-described embodiments are merely illustrative of the numerous arrangements that may be devised for the principles of this invention by those skilled in the art without departing from the spirit and scope of the invention.

What is claimed is:

1. Apparatus for measuring automatically the sound decay characteristic of an enclosure which comprises
    a source of an impulse of energy having a predetermined frequency range and a relatively short time duration,
    means for introducing a selected frequency sub-band of said impulse into said enclosure at a first predetermined point,
    means for detecting at a second predetermined point within said enclosure the sound resulting from said radiated impulse to derive an output signal representative of the impulse response of said enclosure,
    means for reversing the direction of said output signal to obtain a reversed direction signal,
    means for raising said reversed direction signal to the second power to produce a squared signal,
    means for integrating said squared signal, thereby to generate a decay curve signal,
    and means for deriving a visual record from said decay curve signal.

2. Apparatus as defined in claim 1 wherein said means for introducing a selected frequency sub-band of said impulse into said enclosure comprises
    a plurality of filter means each provided with a predetermined pass band, an input terminal, and an output terminal,
    means for connecting said source of an impulse of energy to the input terminal of each of said filter means, and
    a plurality of gating means in one-to-one correspondence with said filter means, wherein each of said gating means is connected to the output terminal of its corresponding filter means so that by enabling a selected gating means a selected frequency sub-band of said impulse is introduced into said enclosure.

3. Apparatus as defined in claim 1 wherein said means for deriving a visual record comprises
    a logarithmic amplifier followed by a graphic recorder.

4. Apparatus as defined in claim 1 wherein said integrating means comprises
    a resistor and a capacitor arranged in an integrating combination so that there is developed across said capacitor a voltage indicative of the integral of said squared signal.

5. The method of determining automatically the sound decay characteristic of an enclosure which comprises the steps of
    introducing a relatively brief impulse of energy having a spectrum covering a selected frequency range into said enclosure at a first selected point,
    converting the sound decay due to said impulse at a second selected point within said enclosure into an electrical wave,
    reversing the direction of said electrical wave,
    computing the integral of the squared amplitude of said reversed direction electrical wave to obtain a proportional electrical charge, and
    plotting a decay curve from said electrical charge.

6. In a system for computing automatically the ensemble average of the squared sound decay of an enclosure, the combination that comprises
    means for radiating at a first selected point within said enclosure a relatively brief impulse of acoustic energy having a predetermined frequency range,
    means for detecting at a second selected point within said enclosure the sound decay due to said impulse to develop a proportional electrical signal,
    means for recording said electrical signal,
    means for reproducing said recorded electrical signal in a direction opposite to that of said electrical signal to form a reversed replica of said electrical signal, and
    means for processing said reversed replica to develop an output signal proportional to said ensemble average, said processing means including
    means for raising said reversed replica to the second power,
    means for integrating the second power of said reversed replica over a predetermined time interval, thereby to develop said output signal proportional to said ensemble average.

7. Apparatus for determining the ensemble average of the squared decay of the excitation of a linear system which comprises
    means for exciting said system at a first predetermined point with a relatively brief impulse of energy covering a selected range of frequencies,
    means for deriving at a second predetermined point of said system an impulse response signal representative of the impulse response of said system,
    means for reversing the direction of said impulse response signal to obtain a reversed replica of said impulse response signal,
    means for raising said reversed replica to the second power to obtain a squared reversed replica, and
    means for integrating said squared reversed replica to develop a signal proportional to said ensemble average.

8. Apparatus for determining automatically the sound decay characteristic of an enclosure which comprises
    a source of an impulse of energy having a selected frequency range,
    a first filter bank including a first plurality of bandpass filters followed by a corresponding first plurality of switching means for passing a predetermined frequency sub-band of said impulse, means for radiating sound energy from said predetermined frequency sub-band of said impulse into said enclosure at a first selected point, detecting means for deriving from the sound decay at a second selected point within said enclosure a proportional electrical signal, means for reversing the direction of said electrical signal to develop a reversed replica of said electrical signal, a second filter bank including a second plurality of bandpass filters followed by a corresponding second plurality of switching means for removing unwanted distortion from said reversed replica, and signal processing means following said second filter bank for deriving, after the removal of unwanted distortion from said reversed replica, an output signal representative of the integral over a selected interval of said reversed replica raised to the second power.

9. Apparatus for measuring automatically the decay characteristic of an enclosure which comprises means for introducing an impulse of acoustic energy having a predetermined spectrum into said enclousre at a first selected point, means for deriving from the sound decay at a second selected point within said enclosure a proportional electrical signal, switching means for selectively applying said electrical signal to one of two subpaths, wherein the first one of said subpaths includes first recording and reversing means for deriving a first reversed replica from said electrical signal wherein said reversed replica is identical with but opposite in direction to said electrical signal, and a first filter bank including a first plurality of filters followed by a corresponding first plurality of gating means for passing a selected frequency sub-band of said reversed replica, and wherein the second one of said subpaths includes a second plurality of filters followed by a second plurality of gating means for passing a selected frequency sub-band of said electrical signal, and a second recording and reversing means for deriving from said selected sub-band of said electrical signal a second reversed replica, wherein said second reversed replica is opposite in direction to said electrical signal and represents said selected frequency sub-band of said electrical signal, and signal processing means following said first and second subpaths for deriving from the reversed replica developed by the selected one of said subpaths an output signal representative of the intergral over a predetermined interval of said reversed replica raised to the second power.

References Cited by the Examiner

UNITED STATES PATENTS

| 2,413,936 | 1/1947 | Winlund | 181—0.5 |
| 2,499,593 | 3/1950 | Kreuzer et al. | 181—0.5 |
| 3,111,186 | 11/1963 | Schroeder | 181—0.5 |

References Cited by the Applicant

"Acoustic Measurements" by L. L. Beranek: issue date 1949, article and page No.: chapter 18.

BENJAMIN A. BORCHELT, *Primary Examiner.*

W. KUJAWA, *Assistant Examiner.*